(12) United States Patent
Foster et al.

(10) Patent No.: US 10,838,818 B2
(45) Date of Patent: Nov. 17, 2020

(54) MEMORY PERSISTENCE FROM A VOLATILE MEMORY TO A NON-VOLATILE MEMORY

(71) Applicant: HEWLETT PACKARD ENTERPRISE DEVELOPMENT LP, Houston, TX (US)

(72) Inventors: Joseph E Foster, Houston, TX (US); Thierry Fevrier, Gold River, CA (US); James Alexander Fuxa, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 18 days.

(21) Appl. No.: 15/761,096

(22) PCT Filed: Sep. 18, 2015

(86) PCT No.: PCT/US2015/051070
§ 371 (c)(1),
(2) Date: Mar. 18, 2018

(87) PCT Pub. No.: WO2017/048294
PCT Pub. Date: Mar. 23, 2017

(65) Prior Publication Data
US 2018/0267860 A1  Sep. 20, 2018

(51) Int. Cl.
*G06F 12/00* (2006.01)
*G06F 11/14* (2006.01)
(Continued)

(52) U.S. Cl.
CPC .......... *G06F 11/1441* (2013.01); *G06F 11/14* (2013.01); *G06F 11/1456* (2013.01);
(Continued)

(58) Field of Classification Search
CPC .. G06F 11/1441; G06F 11/14; G06F 11/1456; G06F 11/1446; G06F 11/1448;
(Continued)

(56) References Cited

U.S. PATENT DOCUMENTS

| 4,965,828 A | 10/1990 | Ergott et al. |
| 5,889,933 A | 3/1999 | Smith |

(Continued)

FOREIGN PATENT DOCUMENTS

| JP | 10320135 | 12/1998 |
| JP | 2012-063538 A | 3/2012 |

(Continued)

OTHER PUBLICATIONS

Avago Syncro 9380-8e Solution, Avago Technologies, 2014, 2 pages.

(Continued)

*Primary Examiner* — Shawn X Gu
(74) *Attorney, Agent, or Firm* — Sheppard Mullin Richter & Hampton LLP

(57) ABSTRACT

A system for achieving memory persistence includes a volatile memory, a non-volatile memory, and a processor. The processor may indicate a volatile memory range for the processor to backup, and open a memory window for the processor to access. The system further includes a power supply. The power supply may provide power for the processor to backup the memory range of the volatile memory. The processor may, responsive to an occurrence of a backup event, initiate a memory transfer using the opened memory window. The memory transfer uses the processor to move the memory range of the volatile memory to a memory region of the non-volatile memory.

18 Claims, 5 Drawing Sheets

(51) Int. Cl.
*G06F 12/16* (2006.01)
*G06F 12/06* (2006.01)
*G06F 12/02* (2006.01)

(52) U.S. Cl.
CPC .......... *G06F 12/0646* (2013.01); *G06F 12/16* (2013.01); *G06F 12/0246* (2013.01); *Y02D 10/13* (2018.01)

(58) Field of Classification Search
CPC ............. G06F 11/1451; G06F 11/1461; G06F 11/1466; G06F 11/1471; G06F 12/0246; G06F 12/0646; G06F 12/16; Y02D 10/13
See application file for complete search history.

(56) References Cited

U.S. PATENT DOCUMENTS

| | | | |
|---|---|---|---|
| 6,079,026 | A | 6/2000 | Berglund |
| 6,181,630 | B1 | 1/2001 | Caulkins |
| 6,901,298 | B1 | 5/2005 | Govindaraj et al. |
| 7,035,155 | B2 | 4/2006 | Stimak et al. |
| 7,293,197 | B2 | 11/2007 | Jadon et al. |
| 7,392,429 | B2 | 6/2008 | Frank |
| 7,490,252 | B2 | 2/2009 | Tsai et al. |
| 7,533,281 | B2 | 5/2009 | Hsieh |
| 7,685,466 | B2 | 3/2010 | Dunstan et al. |
| 8,200,885 | B2 | 6/2012 | Sartore |
| 8,266,398 | B2 | 9/2012 | Manczak et al. |
| 8,453,000 | B2 | 5/2013 | Ben |
| 8,566,561 | B2 * | 10/2013 | Rischar ............... G05B 19/042 711/103 |
| 8,645,735 | B1 * | 2/2014 | Ardis .................... G06F 1/3275 713/320 |
| 8,670,262 | B2 | 3/2014 | Frank et al. |
| 8,674,823 | B1 | 3/2014 | Contario |
| 8,954,385 | B2 | 2/2015 | George et al. |
| 10,320,135 | B2 | 6/2019 | Barker |
| 2004/0103238 | A1 | 5/2004 | Avraham et al. |
| 2005/0117418 | A1 | 6/2005 | Jewell et al. |
| 2005/0138311 | A1 | 6/2005 | Ko |
| 2005/0210218 | A1 * | 9/2005 | Hoogterp ............. G06F 3/0613 711/203 |
| 2006/0015683 | A1 * | 1/2006 | Ashmore .............. G06F 1/3203 711/113 |
| 2006/0139069 | A1 | 6/2006 | Frank et al. |
| 2008/0155190 | A1 | 6/2008 | Ash et al. |
| 2008/0215808 | A1 | 9/2008 | Ashmore |
| 2009/0006574 | A1 | 1/2009 | Horvitz et al. |
| 2010/0169543 | A1 | 7/2010 | Edgington et al. |
| 2011/0010569 | A1 | 1/2011 | Obr et al. |
| 2012/0017037 | A1 | 1/2012 | Riddle et al. |
| 2012/0096251 | A1 | 4/2012 | Aloni et al. |
| 2012/0221891 | A1 | 8/2012 | Shimizu |
| 2013/0254457 | A1 * | 9/2013 | Mukker .............. G06F 11/1441 711/103 |
| 2014/0082406 | A1 | 3/2014 | Erez |
| 2014/0195564 | A1 | 7/2014 | Talagala et al. |
| 2014/0281151 | A1 | 9/2014 | Yu et al. |
| 2014/0310574 | A1 | 10/2014 | Yu et al. |
| 2015/0006834 | A1 | 1/2015 | Dulloor et al. |
| 2015/0074365 | A1 | 3/2015 | Uehara |
| 2016/0118121 | A1 | 4/2016 | Kelly et al. |
| 2017/0220354 | A1 | 8/2017 | Valdez |

FOREIGN PATENT DOCUMENTS

| | | |
|---|---|---|
| JP | 2012226569 | 11/2012 |
| KR | 20120105418 | 9/2012 |
| TW | 200707232 A | 2/2007 |
| WO | 2013/175635 A1 | 11/2013 |
| WO | WO-2014-040065 | 3/2014 |
| WO | WO-2014/047049 A2 | 3/2014 |
| WO | 2014/107957 A1 | 7/2014 |

OTHER PUBLICATIONS

George Crump, "Power Failure and Flash Storage," Storage Switzerland, LLC, Apr. 2013, www.skyera.com/wp-content/uploads/2013/04/Power-Failure-and-Flash-Storage-Handout.pdf.

Metadata Persistence Using Storage Class Memory: Experiences with Flash-backed DRAM—Jose et al., Sep. 9, 2013.

PCT/ISA/KR, International Search Report and Written Opinion, dated Apr. 20, 2016, PCT/US2015/041815; 12 pages.

PCT/ISA/KR, International Search Report and Written Opinion, dated Jun. 29, 2016, PCT/US2015/051070, 15 pages.

PCT/ISA/KR, International Search Report dated Jun. 29, 2015, PCT/US2014/065222, 12 pages.

Thierry Fevrier, U.S. Appl. No. 15/746,841, Preserving Volatile Memory Across a Computer System Disruption, filed Jan. 23, 2018, 32 pages.

Extended European Search Report received for EP Application No. 15899103.4, dated Jun. 28, 2018, 7 pages.

\* cited by examiner

MEMORY PERSISTENCE FROM A VOLATILE MEMORY TO A NON-VOLATILE MEMORY

BACKGROUND

A computing system may include a number of memory modules. These memory modules may serve as system memory, which may store information for running programs and the like. These memory modules may serve also, in some situations, as longer term storage, to store information of the system, even after power cycles.

BRIEF DESCRIPTION OF THE DRAWINGS

The following detailed description references the drawings, wherein.

DETAILED DESCRIPTION

Figure 1:
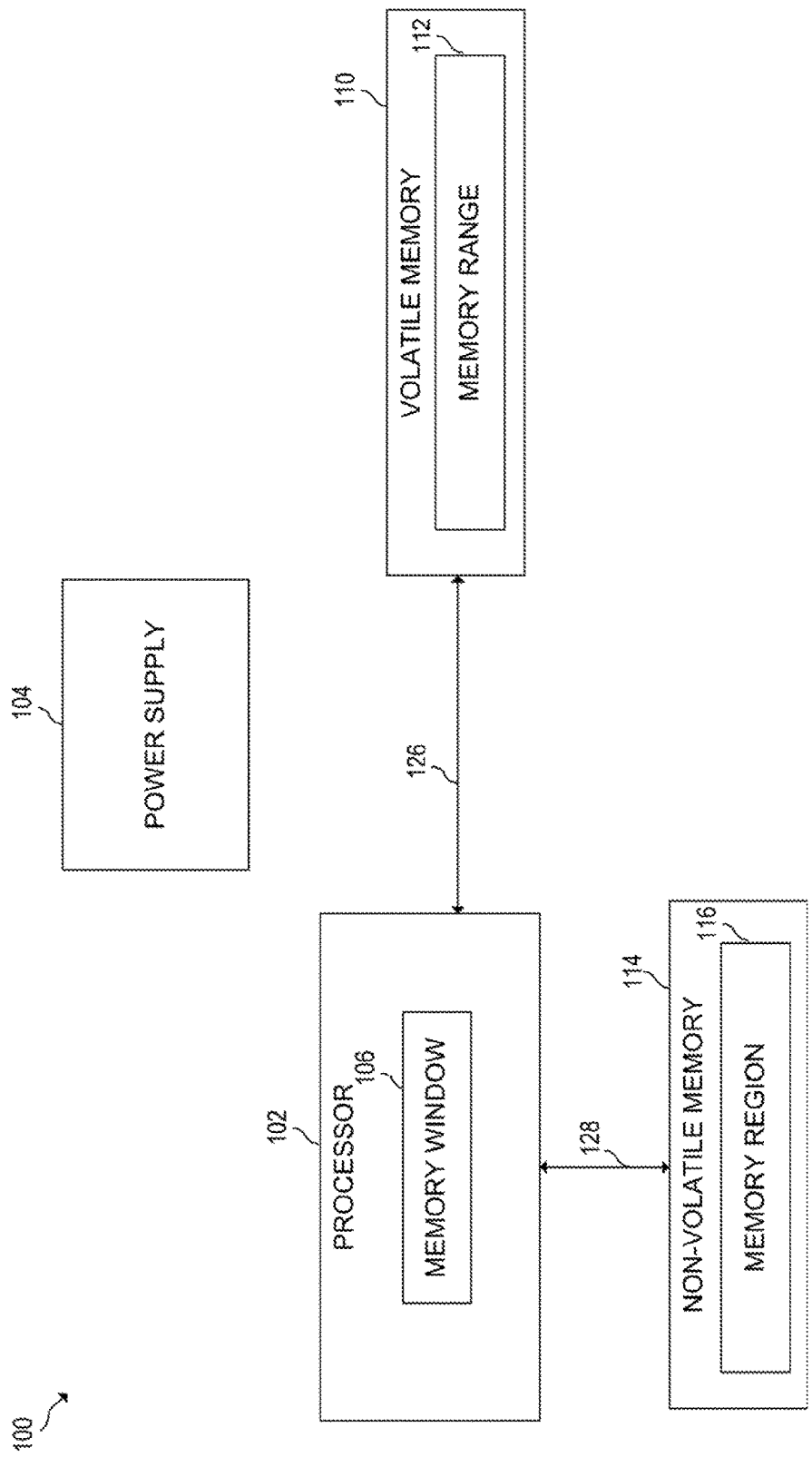
FIG. 1 is a block diagram of an example computing system for physical region backup of a volatile memory to a non-volatile memory.

A computing system may include at least one volatile memory (i.e., memory cell). Examples of volatile memory include dynamic random access memory (DRAM). Volatile memory does not retain data in the event of a power failure or a reboot. A computing system may also include non-volatile memory. Non-volatile memory retains data in the event of power loss or a reboot. Non-volatile memory may be, for example, flash memory, memristor memory, phase change memory, or the like.

Many applications, such as databases, and various distributed computing frameworks, keep large datasets and/or other state in system RAM, which may generally comprise volatile memory. Within the datasets of these applications, there may exist certain state data. If the state data is stored in volatile memory, this state data may be lost in the event of a power failure. Losing such state data may have severe consequences. For a database application, the database may have to rebuild the database from a previous checkpoint that may not be up-to-date. For some applications, such as file systems, the loss of such state data may result in data corruption or other catastrophic failures.

To address the issue of state data loss, this disclosure describes techniques for backing up a memory region of a volatile memory region to a region of non-volatile memory. By backing up the volatile memory region, various aspects of this disclosure enable a computing system to achieve memory persistence.

According to aspects of this disclosure, in the event of a power and/or component failure, a processor may backup a physical region of volatile memory. As described herein, a processor may comprise at least one of a CPU, controller, microcontroller, storage controller, finite state machine (FSM), volatile or non-volatile memory controller, finite state machine, field programmable gate array (FPGA) a dynamic memory access (DMA) engine, system BIOS (basic input output system), a DIMM (dynamic inline memory module) controller, the like or any combination thereof. The processor may be implemented in hardware, software, firmware, or any combination thereof.

The memory region of the volatile memory that the processor backs up may be indicated based on an input, such as a user input, in some examples. In some examples, the input may comprise a server, and/or application input that indicates the volatile memory range. In various examples, the input may be received from a server, hardware device, BIOS, base management controller, and/or manageability component. The processor may also determine the memory region of the volatile memory based on various stored, measured or observed transfer speed and/or power data in order to ensure that there will be sufficient backup bandwidth and power to perform the backup operation.

In the event of catastrophic hardware failure of a system, and after the processor backs up the volatile memory region, an administrator or technician may move the persisted memory to a different working system. For example, in the event of a CPU failure or power supply failure, a processor may backup the contents of volatile memory to one or more solid state drives (SSDs). An administrator may move the SSDs that include the backed-up volatile memory contents to a working system (e.g. another server in a datacenter). The working system may then resume execution where the failed system left off based on the memory contents stored in the non-volatile memory region, thus minimizing or eliminating data loss.

In some examples of this disclosure, a processor as described herein may use DMA transfers to initiate the backup operations. DMA transfers are extremely fast, low latency operations. Additionally, there may be multiple DMA controllers (also referred to as DMA engines) in a computing system, each of which may perform DMA transfers in parallel, which may further improve backup throughput. As an example, if a system has multiple DIMMs, each DMA controller may initiate a transfer for a respective DIMM, which may improve backup throughput.

Additionally, the time to complete a partial backup of a physical memory region to a non-volatile memory region may be less than the time to perform a full memory backup, which may be time consuming. For example, backing up one full memory module could take up to 2 minutes, which may use a great deal of backup power.

In some examples, the processor may comprise a storage controller Using a storage controller may enable increased backup throughput to non-volatile memory by enabling parallel writes to multiple non-volatile memories, which may speed the backup operation. Additionally, the storage controllers may include hardware accelerators, such as dedicated XOR hardware, which may increase the backup throughput. Storage controllers also may also include encryption capabilities, and/or encryption acceleration capabilities, which may enable accelerated encrypted volatile memory backups. Storage controllers may also include capabilities for restoring data responsive to a power failure. Thus, a storage controller may perform volatile memory restoration with little to no modification.

The present disclosure describes examples for achieving memory persistence of a volatile memory using a non-volatile memory. To achieve memory persistence, a processor of a computing system may determine a memory range for a processor to backup, and determine that sufficient bandwidth to backup the memory range is available.

Responsive to determining that sufficient bandwidth to backup the memory range is available, the computing system may open a memory window for the processor to access. The system may also include a power supply to provide power for the processor to backup the memory window. Responsive to an occurrence of a backup event, such as a reboot, power failure, system shutdown, or hardware failure, the processor may initiate a memory transfer using the opened memory window. The memory transfer causes the processor to move the contents of the volatile memory to a non-volatile storage medium.

FIG. 1 is a block diagram of an example computing system 100 example computing system for achieving memory persistence from a volatile memory to a non-volatile memory. System 100 may be any computing system or computing device capable of using non-volatile memory and volatile memory. System 100 may include at least one processor 102, a power supply 104, processor 102, a volatile memory 110, and a non-volatile memory 114.

In the examples described herein, processor 102 may comprise a central processing unit (CPU), microcontroller, storage controller, FPGA, memory controller, DMA engine, system firmware, or any combination thereof. Processor may execute an operating system (OS) and/or applications. The OS may comprise an operating system such as Microsoft Windows, Linux, Apple OS X, or the like. The OS may manage and perform tasks related to allocation of resources of system 100, such as: memory allocation, disk access, allocation of execution time on processor 102, multi-tasking, handling of execution modes, networking, user interface, and/or interrupt handling.

Power supply 104 may generally supply power to system 100 during a backup event. In some examples, power supply 104 may comprise a datacenter rack UPS (uninterruptible power supply), a micro UPS, one or more ultracapacitors, and/or or a datacenter UPS.

Volatile memory 110 may generally comprise any volatile memory, such as at least one DIMM of DDR (double data rate) SDRAM (synchronous DRAM). Non-volatile memory 114 may comprise any type of non-volatile memory, such as at least one: hard disk drive (HDD), SSD, memristor, phase change memory (PCM), 3D XPoint memory, or the like. Memory region 116 of non-volatile memory 114 may comprise a region of non-volatile memory 114 that is set aside specifically for backup. Non-volatile memory 114 may not be accessible to the OS, and may be accessible to BIOS 108 in some examples. Processor 102 may be communicatively coupled to volatile memory 110 via a communication bus 126, and may be coupled with non-volatile memory 114 via communication bus 128.

As described above, a volatile memory generally loses its contents upon events such as power loss, reboots, catastrophic hardware failure, operating system shutdowns, system crashes, and the like. This disclosure refers to the aforementioned events as "backup events." Processor 102 may backup memory range 112 to memory region 116 to achieve memory persistence. That is, processor 102 may backup memory range 112 to be able to restore memory range 112 after a backup event.

To achieve memory persistence, an operating system, which may execute on processor 102, may present a user with an option to backup memory range 112 to non-volatile memory 114 in some examples. The user may select a size for memory range 112 in some examples. In some examples, the user may specify a particular application that is to be persisted in the occurrence of a backup event. In other examples, system 100 may be preconfigured to generate an input that indicates a size of memory range 112.

Memory range 112 being indicated, processor 102 may determine an address range associated with memory region 116. Processor 102 may also allocate memory region 116 to store the backup of memory range 112. Memory region 116 may be inaccessible to a user and/or operating system in some examples.

Processor 102 may determine whether there is enough power and bandwidth to complete a backup operation for the user-specified memory range 112. Processor 102 may determine whether there is enough backup power and bandwidth by conducting a backup test transfer, in some examples. For example, processor 102 may determine the size of memory range 112, and measure the bandwidth achieved using test memory transfers to copy the contents of memory range 112 to memory region 116 of non-volatile memory 114. Processor 102 may also measure the power consumed doing the test memory transfer operation, and the time elapsed to complete the test memory transfer operation. In some other examples, processor 102 may determine whether there is sufficient backup power and bandwidth based on values from a lookup table. The lookup table may comprise entries that map a particular transfer size to an amount of power consumed during a backup operation, as an example.

Based on the time elapsed to complete the test memory transfer and the power consumed during a time period of the test transfer or based on the lookup table, processor 102 may determine whether memory range 112 can be backed-up responsive to a backup event. The operating system may notify the user whether or not a backup can be completed based on the test transfer results. If processor 102 determines that a backup cannot be completed, the operating system may prompt the user to reduce the size of memory range 112 or processor 102 may determine a smaller region of memory corresponding to memory range 112.

In some examples, system 100 may conduct a series of test transfers at the time of system installation or burn-in to determine an amount of power and time to backup various sizes of memory range 112. Based on these burn-in or initialization test transfers, and the size of the memory range determined for backup, processor 102 may determine whether a backup can be completed. In some examples, processor 102 may store the The BIOS or processor 102 may open memory window 106 corresponding to memory range 112 to volatile memory 110 with which processor 102 may use to access memory region identified by the memory range 112. In various examples, memory window 106 may comprise a memory-mapped address range. Processor 102 or the BIOS ensures that the memory window 106 is successfully allocated, and notifies processor 102 that the memory-mapped window has been successfully allocated. The BIOS also ensures that power supply 104 is charged and ready to provide power during a backup operation. Responsive to successfully allocating the memory-mapped window, the BIOS may arm processor 102 or processor 102 may arm itself.

Responsive to being armed and charged, processor 102 waits for a backup event to occur. Responsive to determining that a backup event has occurred, processor 102 initiates a memory transfer. The memory transfer may transfer data using memory window 106 to move the contents of memory range 112 of volatile memory 110 to memory region 116 of non-volatile memory 114. Additional examples according to aspects of this disclosure will now be described.

Figure 2:
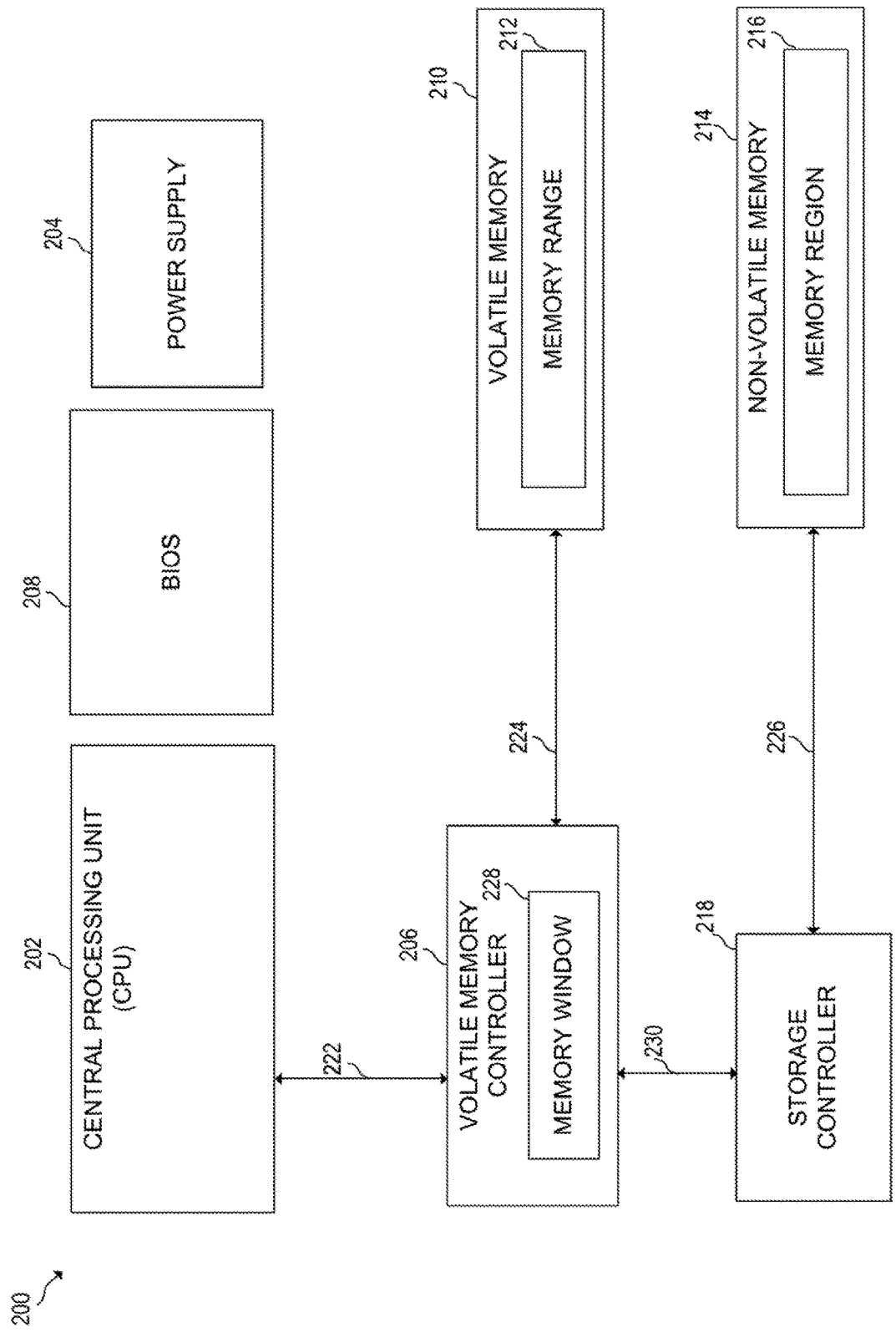
FIG. 2 is a block diagram of an example method for physical region backup of a volatile memory to a non-volatile memory.

FIG. 2 is a block diagram of an example computing system 200 example computing system for achieving memory persistence from a volatile memory to a non-volatile memory. System 200 may be any computing system or computing device capable of using non-volatile memory and volatile memory. System 200 may include at least one central processing unit (CPU) 202, a power supply 204, volatile memory controller 206, BIOS 208, volatile memory 210, a non-volatile memory 214, and a storage controller 218.

CPU 202, volatile memory controller 206, storage controller 218, volatile memory 210, and non-volatile memory 214 may be communicatively coupled via communication buses 222, 224, 226, and/or 230. In various examples, communication buses 222, 224, 226, and/or 230 may comprise one or more of: a memory bus, peripheral component interconnect express (PCIe) bus, a serial advanced technology attachment (SATA) interface, a serial attached small computer systems interface (SAS), an I2C (inter-integrated circuit) interface, or a system management bus (SmBus). CPU 202 may execute an OS. CPU 202 may be communicatively coupled with volatile memory controller 206, storage controller 218, BIOS 208, and/or power supply 204.

Volatile memory controller 206 may comprise a DRAM controller, which is communicatively coupled to volatile memory 210. Volatile memory controller 206 may partially control access, and refresh of DIMMs of volatile memory 210. In some examples, volatile memory controller 206 may be integrated with CPU 202. Storage controller 218 may comprise e.g., an RAID controller, a Host Bus Adaptor (HBA), a Network Interface Card (NIC), an SSD controller, a phase change RAM controller, a 3D Xpoint Controller, and/or a memristor controller or the like. In some examples storage controller 218 may be integrated with memory controller 218 and/or CPU 202.

BIOS 208 may generally comprise a firmware abstraction layer for interacting with hardware, such as input-output (I/O) devices, display, mouse, keyboards, and the like. BIOS 208 may also comprise an abstraction layer comprising one or more register or memory values, or an application programming interface (API) for interacting with power supply 204, volatile memory controller 206, storage controller 218, volatile memory 210, and non-volatile memory 214.

Volatile memory 210 may generally comprise any volatile memory, such as at least one DIMM of DDR (double data rate) SDRAM (synchronous DRAM). Volatile memory 210 includes memory range 212. BIOS 208 may determine an address range associated with memory range 212 automatically, via an OS API, and/or based on user input that indicates the memory range. In some examples, volatile memory 210 may comprise a plurality of memory modules, and memory range 212 may correspond to a number of the plurality of memory modules. To determine memory range 212, storage controller 218 may determine a number of the plurality of memory modules to preserve.

Non-volatile memory 214 may comprise any type of non-volatile memory, such as at least one: hard disk drive (HDD), SSD, memristor, phase change memory (PCM), 3D Xpoint memory, or the like. Memory region 216 of non-volatile memory 214 may comprise a region of non-volatile memory 214 that is set aside specifically for backup. For example, memory region 216 may comprise blocks of a non-volatile memory device, or a plurality of blocks striped across a plurality of non-volatile memory devices. Memory region 216 may not be accessible to an operating system (OS), and may just be accessible to BIOS 208 in some examples.

In accordance with aspects of this disclosure, storage controller 218 may determine memory range 216 of non-volatile memory 214 for storage controller 218 to backup. In various examples, storage controller 218 may comprise a plurality of storage controllers. Each of the storage controllers may be coupled with at least one non-volatile memory, e.g. an SSD.

In various examples, storage controller 208, CPU 202, volatile memory controller 206 or any other processor described herein may also include various hardware acceleration functionality, such as hardware XOR (exclusive or) hardware to calculate parity and/or to perform striping across a storage array. Additionally, storage controller 218 may include encryption hardware, which may allow or accelerate encryption during a memory transfer backup operation of memory range 212.

According to the techniques of this disclosure, an OS or BIOS 208 may determine memory range 212 of volatile memory 210 for storage controller 218 to backup. BIOS 208 may then determine whether there is sufficient bandwidth to backup memory range 212. BIOS 208 may determine whether there is sufficient bandwidth based on at least one test memory transfer from volatile memory 210 to non-volatile memory 214. In some examples, BIOS 208 may determine whether there is sufficient bandwidth based on a lookup table. BIOS 208 may also determine whether there is a sufficient amount of power available to power supply 204 to perform the backup operation. BIOS 208 may, for example, read a power level of power supply 204 to determine whether the amount of power available to storage controller 218 is sufficient. In some examples, BIOS 208 may determine whether there is sufficient bandwidth and/or power to perform the backup operation based on a lookup table.

After determining that sufficient bandwidth and/or power to backup memory range 212 is available, BIOS 208 may open memory window 228. Memory window 228 may comprise a memory-mapped window (e.g., an address range) that allows access to memory range 212. Responsive to opening memory window 228, BIOS 208 may notify storage controller 218 that memory window 228 has opened. In some examples, BIOS 208 may also determine that memory interrupts, processor levels, and input-output paths are allocated and free for a transfer.

BIOS 208 may charge power supply 204 to provide power for volatile memory controller 206, storage controller 218, volatile memory 210, non-volatile memory 214, and/or CPU 202 to backup memory range 212 to memory range 216. BIOS 208, CPU 202, power supply 204, volatile memory controller 206, and/or non-volatile memory controller 218 may then wait for a backup event.

Responsive to an occurrence of a backup event, which BIOS 208, CPU 202, power supply 204, volatile memory controller 206, and/or non-volatile memory controller 218 may detect, the detecting component(s) of system 200 may send a signal to storage controller 218 to initiate a transfer. BIOS 208 or another component may further send a signal that causes power supply 204 to charge. Storage controller 218 may receive the signal from BIOS 208 that the backup event has occurred and that power supply 204 is charged, and may initiate a transfer using memory window 228. The transfer uses storage controller 218 to move the contents of memory range 212 to memory region 216.

Figure 3:
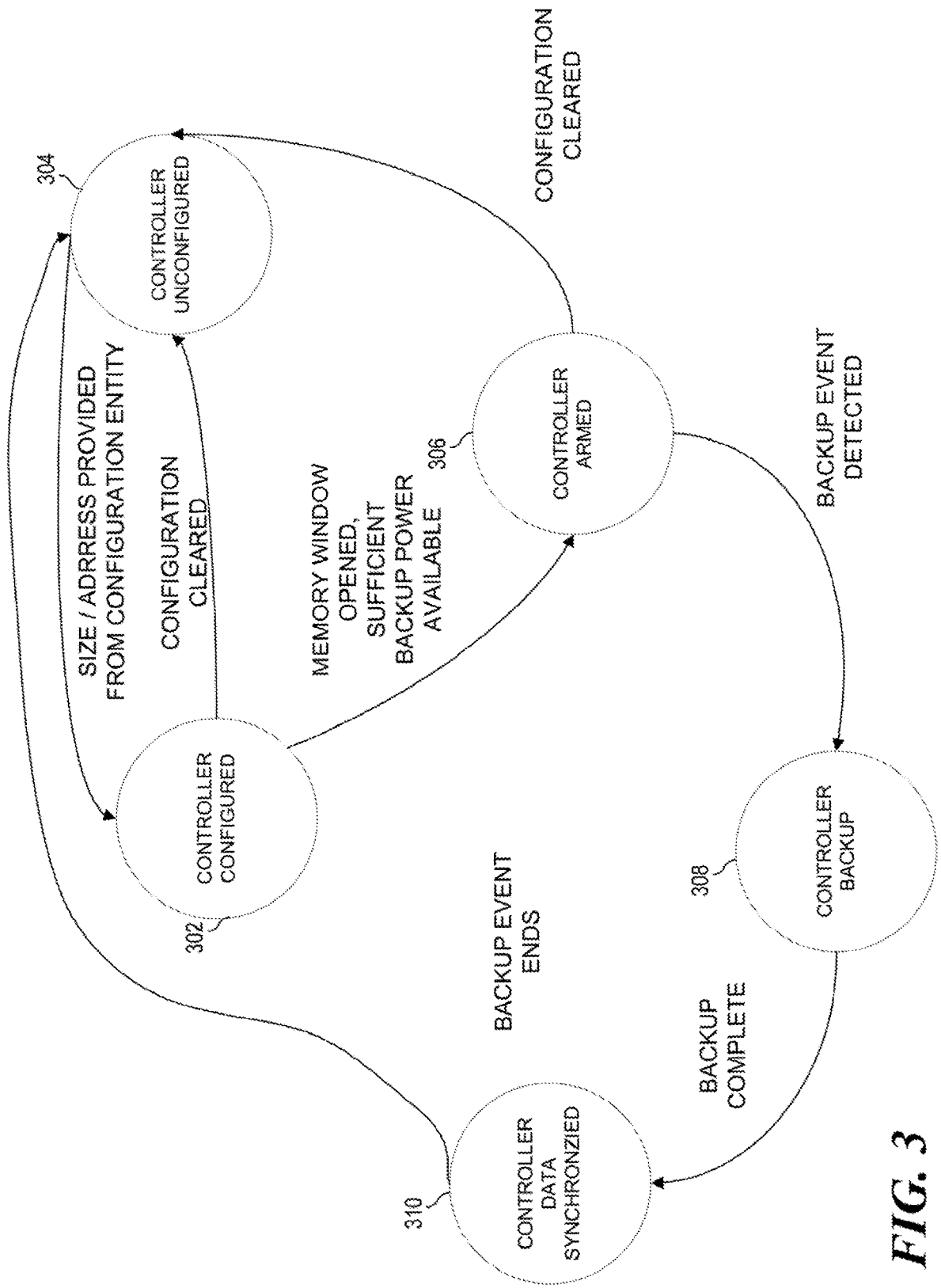
FIG. 3 is an example state machine for physical region backup of a volatile memory to a non-volatile memory.

FIG. 3 is an example state machine for physical region backup of a volatile memory to a non-volatile memory. The state machine of FIG. 3 may be executed by system 100 or system 200 of FIG. 1 or FIG. 2, as examples. The state machine of FIG. 3 may begin at state 304, at which the processor, e.g. processor 102 or 218, is unconfigured. During the unconfiguration state, the BIOS may determine configuration information, such as a memory range of volatile memory to backup, as well as a memory region of non-volatile memory at which to backup the volatile memory. Once the configuration information is obtained, the system transitions to state 302.

Responsive to clearing the configuration, the system may proceed to state 304, at which the processor is in the unconfigured state. If a new size and/or address of a volatile memory region are provided, the system may return to state 302. From state 302, BIOS may open a memory window and determine that sufficient backup power is available. Responsive to determining the window is open and sufficient backup power is available, the system may enter state 306. If the configuration is cleared after entering state 306, the system returns to state 304.

If the system detects a backup event at state 306, the system proceeds to state 308. The system stays in state 308 until backup is complete, at which point the system enters state 310. The system may stay in state 310 until the backup ends, e.g. if power is restored, the system comes back online, and/or a catastrophic hardware failure is fixed. After the backup event ends at state 310, the system may enter state 304. After the backup event ends at state 310, the system may restore a backup image if the backup image is valid. If there is a valid backup image, the system may restore the backup image prior to going to state 302.

Figure 4:
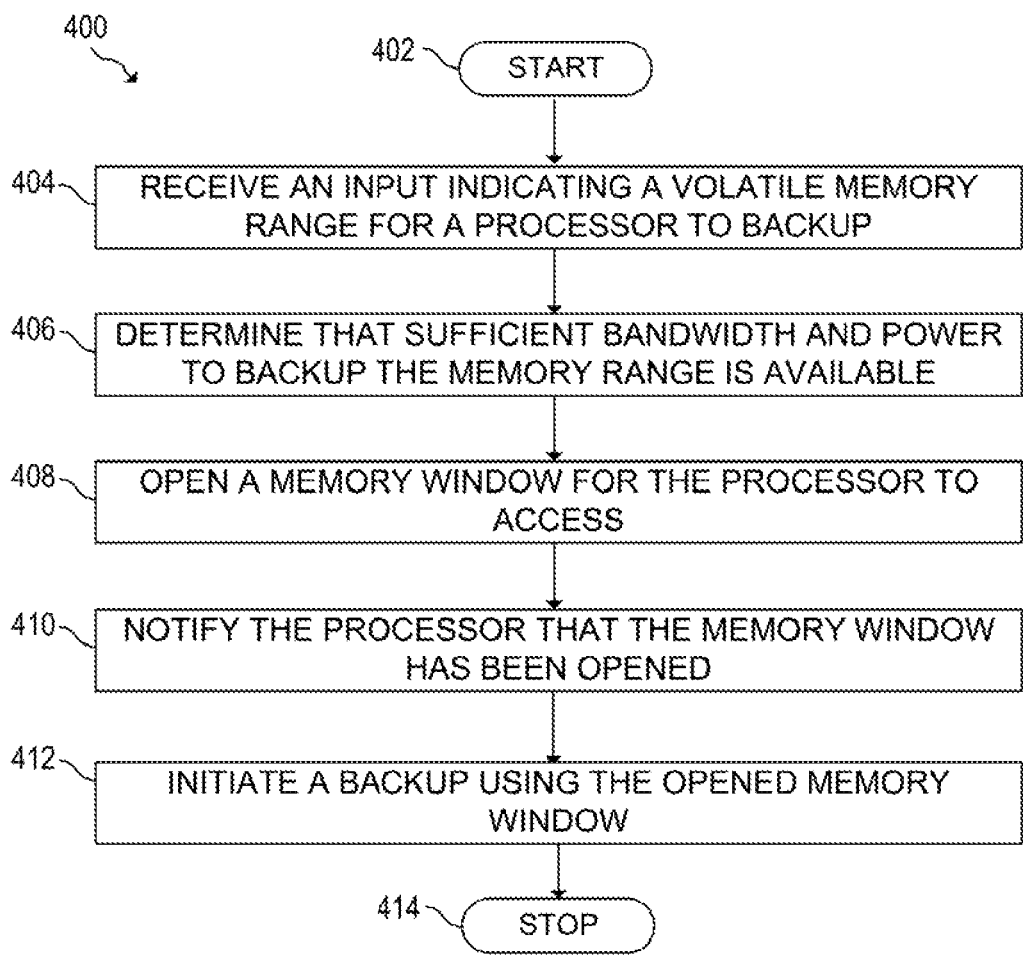
FIG. 4 is a flowchart of an example method for physical region backup of a volatile memory to a non-volatile memory.

FIG. 4 is a flowchart of an example method 400 for partial backup during runtime for memory modules with volatile memory and non-volatile memory. Method 400 may be described below as being executed or performed by a system, for example, processor 102 of system 100 of FIG. 1. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate examples of the present disclosure, one or more blocks of method 400 may be executed substantially concurrently or in a different order than shown in FIG. 4. In alternate examples of the present disclosure, method 400 may include more or less blocks than are shown in FIG. 4. In some examples, one or more of the blocks of method 400 may, at certain times, be ongoing and/or may repeat.

Method 400 may start at block 402 and continue to block 404, where the system may receive an input, such as a BIOS or user input, indicating a volatile memory range for a processor, e.g., processor 102, volatile memory controller 206, and/or storage controller 218, to backup. in some examples. In some examples, the input may comprise a server, and/or application input that indicates the volatile memory range. In various examples, the input may be received from a server, hardware device, BIOS, base management controller, and/or manageability component of the computing system.

At block 406, the system may determine that sufficient bandwidth and/or power to backup the memory range is available. At block 408, the system may open a memory window, e.g. memory window 228 or 106 for the processor to access. In some examples, the system may notify the processor that the memory window has been opened. At block 410 power supply 204 or 104 may provide power for the processor to backup the memory range of the volatile memory. At block 412, the system may initiate a backup using the opened memory window responsive to an occurrence of a backup event. In some examples, the memory transfer may use the processor 102, volatile memory controller 206, and/or storage controller 218 to move the memory range of the volatile memory to a memory region of a non-volatile memory.

In some examples, the system may determine that there is insufficient bandwidth or power to backup the memory range of the volatile memory. Responsive to determining that there is insufficient bandwidth, the system may notify a user, application, and/or OS that there is insufficient bandwidth or power. In various examples, to initiate the backup, the system may initiate a plurality of backups in parallel using a plurality of DMA controllers, e.g. processor 102, volatile memory controller 206, and/or storage controller 218 or DMA engine(s) included therein.

In various examples, determining that sufficient bandwidth and power to backup the memory range may be based on performing a test memory transfer to determine available bandwidth and power consumption associated with the memory transfer. Determining that sufficient bandwidth and power to backup the memory range is available may be based on performing the test memory transfer.

Figure 5:
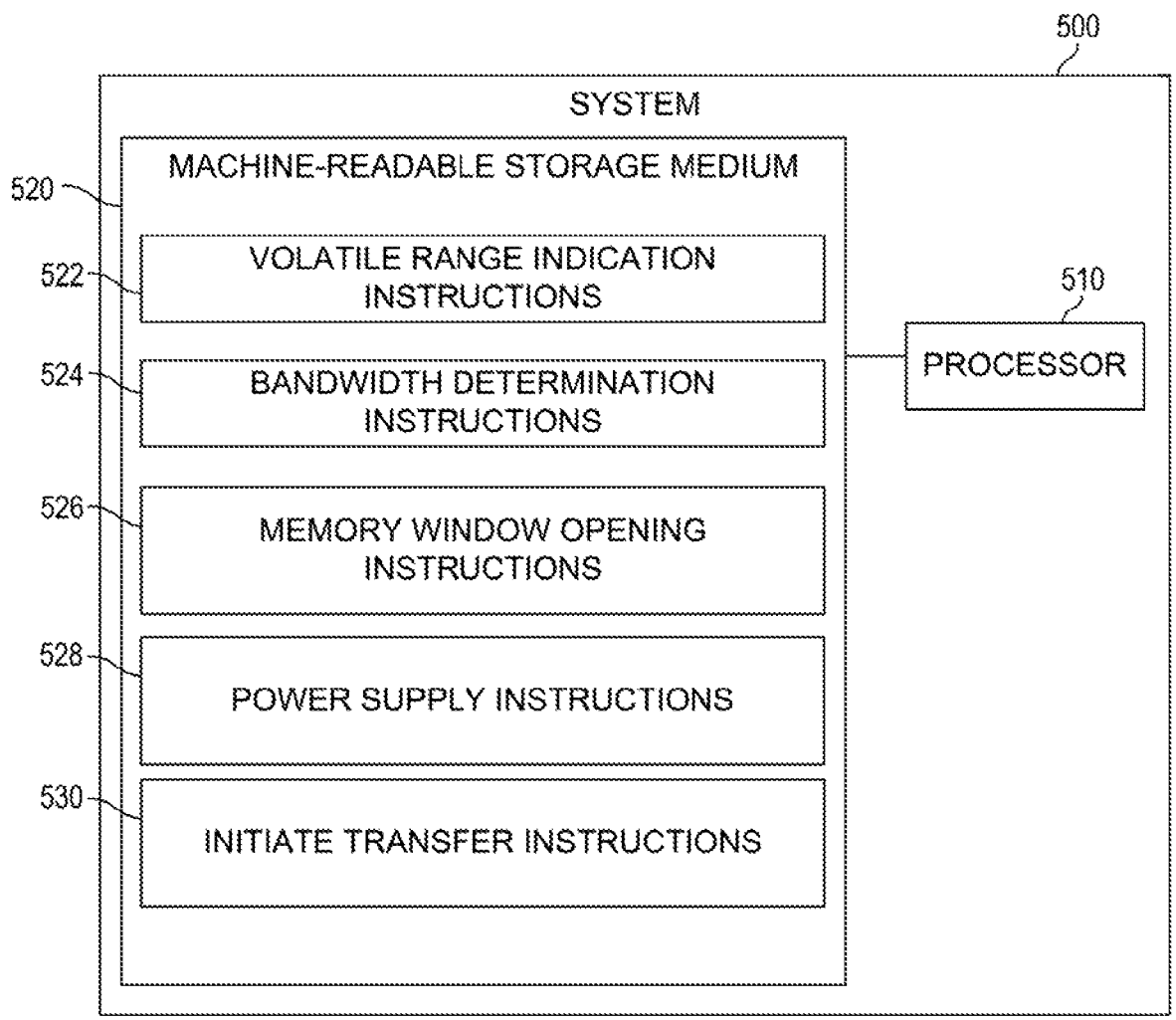
FIG. 5 is a block diagram of an example system for physical region backup of a volatile memory to a non-volatile memory.

FIG. 5 is a block diagram of an example system for physical region backup of a volatile memory to a non-volatile memory. System 500 may be similar to system 100 of FIG. 1, for example. In the example of FIG. 5, system 500 includes a processor 510 and a machine-readable storage medium 520. Processor 510 may be similar to processor 102 of FIG. 1. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 510 may be one or more central processing units (CPUs), microprocessors, and/or other hardware devices suitable for retrieval and execution of instructions stored in machine-readable storage medium 520. Processor 510 may comprise a controller, FPGA, finite state machine or any combination of processors described herein. In the particular examples shown in FIG. 5, processor 510 may fetch, decode, and execute instructions 522, 524, and 526, to achieve memory persistence of a volatile memory. As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within system 500, as shown in FIG. 5. In this situation, the executable instructions may be "installed" on the system 500. Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions for partial backup during runtime for memory modules with volatile memory and non-volatile memory.

Referring to FIG. 5, volatile range determination instructions 522, when executed by a processor (e.g., 510), may cause system 500 to determine a volatile memory range for a processor to preserve based on an input. Bandwidth determination instructions 524, when executed by a processor (e.g., 510), may cause system 500 to determine that sufficient bandwidth to backup the memory range is available. Memory window opening instructions 526, when executed by a processor (e.g., 510), may cause system 500 to open a memory window for the processor to access using the BIOS. Power supply instructions 528 when executed, e.g. by processor 510 may cause system 500 to provide power for the processor to backup the memory window using a power supply. Initiate transfer instructions 530, when executed by processor 510 may cause system 500 to initiate a backup from the opened memory window responsive to an occurrence of a backup event. The memory transfer may cause the processor to move the memory range of the volatile memory to a memory region a non-volatile memory.

In some examples, system 500 may further comprise machine-readable instructions that, when executed, cause a processor (e.g., 510) to notify an operating system that manages execution of the application responsive to finishing the backup of the physical region of the volatile memory.

The invention claimed is:

1. A system for achieving memory persistence, the system comprising:
    a power supply configured to provide power to one or more components of the system;
    a volatile memory;
    a non-volatile memory; and
    a processor configured to:
        indicate a volatile memory range for the processor to backup;
        responsive to indicating the volatile memory range, allocate a memory window to access a first memory region of the volatile memory identified by the volatile memory range, wherein the memory window comprises a memory-mapped address range corresponding to the volatile memory range;
        allocate a second memory region in the non-volatile memory for backing up the first memory region;
        perform a test memory transfer of contents of the volatile memory range to determine bandwidth and power consumption associated with the test memory transfer; and
        responsive to successful opening of the allocated memory window and an occurrence of a backup event, initiate a memory transfer from the first memory region to the second memory region using the opened allocated memory window.

2. The system of claim 1, wherein the processor comprises a dynamic memory access (DMA) controller, wherein the memory transfer comprises a DMA transfer.

3. The system of claim 1, wherein the processor comprises a storage controller.

4. The system of claim 1, wherein the processor includes encryption hardware to encrypt a plurality of contents of the first memory region for the memory transfer.

5. The system of claim 1, wherein the processor is further configured to:
    receive an input indicating the volatile memory range.

6. The system of claim 1, further comprising a basic input output system (BIOS), wherein the BIOS is configured to:
    allocate the memory window to the processor; and
    notify the processor that the memory window has been allocated and opened.

7. The system of claim 6, wherein the BIOS is further configured to:
    determine whether there is a sufficient amount of bandwidth or power available to perform the backup; and
    in response to determining that there is insufficient bandwidth or power, send a notification.

8. The system of claim 1, wherein the volatile memory comprises a plurality of memory modules; and
    wherein indicating the volatile memory range includes determining a number of the plurality of memory modules to preserve.

9. A method for achieving memory persistence, the method comprising:
    indicating a volatile memory range for a processor to backup;
    responsive to indicating the volatile memory range, allocating a memory window for the processor to access a first memory region of a volatile memory identified by the volatile memory range, wherein the memory window comprises a memory-mapped address range corresponding to the volatile memory range;
    allocating a second memory region in a non-volatile memory for backing up the first memory region;
    providing power from a power supply to the processor to backup the memory window;
    performing a test memory transfer of contents of the volatile memory range to determine bandwidth and power consumption associated with the test memory transfer; and
    responsive to successful opening of the allocated memory window and an occurrence of a backup event, initiating a memory transfer from the first memory region to the second memory region using the opened allocated memory window.

10. The method of claim 9, further comprising:
    determining that there is insufficient bandwidth or power to backup the volatile memory range; and
    sending a notification that there is insufficient bandwidth or power.

11. The method of claim 9, further comprising:
    wherein the memory transfer comprises a dynamic memory access (DMA) transfer using a DMA controller of the processor.

12. The method of claim 9, further comprising encrypting a plurality of contents of the first memory region for the memory transfer.

13. The method of claim 9, wherein the volatile memory comprises a plurality of memory modules; and
    wherein indicating the volatile memory range includes determining a number of the plurality of memory modules to preserve.

14. A non-transitory machine-readable storage medium encoded with instructions for achieving memory persistence, the instructions executable by a processor of a system to cause the system to:
- indicate a volatile memory range for a processor to backup;
- responsive to indicating the volatile memory range, allocating a memory window for the processor to access a first memory region of a volatile memory identified by the volatile memory range, wherein the memory window comprises a memory-mapped address range corresponding to the volatile memory range;
- allocating a second memory region in a non-volatile memory for backing up the first memory region;
- provide power from a power supply to the processor to backup the volatile memory range;
- perform a test memory transfer of contents of the volatile memory range to determine bandwidth and power consumption associated with the test memory transfer; and
- responsive to successful opening of the allocated memory window and an occurrence of a backup event, initiating a memory transfer from the first memory region to the second memory region using the opened allocated memory window.

15. The non-transitory machine-readable storage medium of claim 14, wherein the backup event comprises at least one of:
   a power loss, a shutdown, a reboot, or a hardware failure.

16. The non-transitory machine-readable storage medium of claim 14, wherein the instructions further comprise instructions executable by the processor to cause the system to:
- determine that there is insufficient bandwidth or power to backup the volatile memory range; and
- send a notification that there is insufficient bandwidth or power.

17. The non-transitory machine-readable storage medium of claim 14, wherein the instructions further comprise instructions executable by the processor to cause the system to encrypt a plurality of contents of the first memory region for the memory transfer.

18. The non-transitory machine-readable storage medium of claim 14, wherein the volatile memory comprises a plurality of memory modules; and
   wherein indicating the volatile memory range includes determining a number of the plurality of memory modules to preserve.

* * * * *